United States Patent
Elshafie et al.

(10) Patent No.: US 11,930,527 B2
(45) Date of Patent: Mar. 12, 2024

(54) TECHNIQUES FOR INDICATING SYSTEM INFORMATION BLOCK OR PAGING WAVEFORMS FOR FUTURE COMMUNICATIONS

(71) Applicant: QUALCOMM Incorporated, San Diego, CA (US)

(72) Inventors: Ahmed Elshafie, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/512,351

(22) Filed: Oct. 27, 2021

(65) Prior Publication Data
US 2023/0126458 A1 Apr. 27, 2023

(51) Int. Cl.
*H04W 74/00* (2009.01)
*H04L 27/26* (2006.01)
*H04W 56/00* (2009.01)
*H04W 74/08* (2009.01)

(52) U.S. Cl.
CPC ....... *H04W 74/006* (2013.01); *H04L 27/2607* (2013.01); *H04W 56/001* (2013.01); *H04W 74/0833* (2013.01); *H04W 74/0866* (2013.01)

(58) Field of Classification Search
None
See application file for complete search history.

(56) References Cited

U.S. PATENT DOCUMENTS

| | | | | |
|---|---|---|---|---|
| 10,880,864 B2 * | 12/2020 | Zhang | | H04L 27/2646 |
| 11,140,715 B2 * | 10/2021 | Ly | | H04W 74/0833 |
| 11,218,285 B2 * | 1/2022 | Ji | | H04L 5/0044 |
| 2018/0116000 A1 * | 4/2018 | Ly | | H04W 74/006 |
| 2019/0261315 A1 * | 8/2019 | Zhang | | H04L 1/0001 |
| 2019/0387546 A1 * | 12/2019 | Li | | H04L 27/26132 |
| 2020/0313835 A1 * | 10/2020 | Ji | | H04L 5/0053 |
| 2020/0314709 A1 * | 10/2020 | Ly | | H04W 36/0072 |
| 2020/0389786 A1 * | 12/2020 | Yerramalli | | H04W 74/0833 |
| 2021/0297204 A1 * | 9/2021 | Davydov | | H04L 27/2605 |
| 2021/0345416 A1 * | 11/2021 | Hu | | H04W 74/0833 |
| 2022/0286325 A1 * | 9/2022 | Gunturu | | H04L 25/03006 |
| 2022/0345261 A1 * | 10/2022 | Ali | | H04L 5/0096 |

(Continued)

FOREIGN PATENT DOCUMENTS

WO 2021084333 A1 5/2021

OTHER PUBLICATIONS

International Search Report and Written Opinion—PCT/US2022/077541—ISA/EPO—dated Feb. 1, 2023.

*Primary Examiner* — Faiyazkhan Ghafoerkhan
(74) *Attorney, Agent, or Firm* — Arent Fox, LLP

(57) ABSTRACT

Techniques for indicating system information block or paging waveforms for future communications may include a user equipment (UE) configured to identify a waveform configuration of a downlink (DL) signal including system information to be received from a base station during a random access channel (RACH) procedure in response to an indication of the waveform configuration of the DL signal. The UE may also be configured to receive, from the base station, the system information in response to the waveform configuration of the DL signal being identified.

24 Claims, 7 Drawing Sheets

600

602
Identifying a waveform configuration of a DL signal including system information to be received from a base station during an RACH procedure in response to an indication of the waveform configuration of the DL signal 604
Receiving, from the base station, the system information in response to the waveform configuration of the DL signal being identified

(56) References Cited

U.S. PATENT DOCUMENTS

2023/0113695 A1* 4/2023 Elshafie .............. H04W 74/006
 370/329
2023/0126458 A1* 4/2023 Elshafie ................ H04L 5/0092
 370/329

* cited by examiner

600

602
Identifying a waveform configuration of a DL signal including system information to be received from a base station during an RACH procedure in response to an indication of the waveform configuration of the DL signal

604
Receiving, from the base station, the system information in response to the waveform configuration of the DL signal being identified

*FIG. 6*

TECHNIQUES FOR INDICATING SYSTEM INFORMATION BLOCK OR PAGING WAVEFORMS FOR FUTURE COMMUNICATIONS

TECHNICAL FIELD

Aspects of the present disclosure relate generally to wireless communications, and more particularly, to techniques for indicating system information block or paging waveforms for future communications.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, method of wireless communication by a user equipment (UE) is provided. The method may include identifying a waveform configuration of a downlink (DL) signal including system information to be received from a base station during a random access channel (RACH) procedure in response to an indication of the waveform configuration of the DL signal. The method may also include receiving, from the base station, the system information in response to the waveform configuration of the DL signal being identified.

In another example, a method of wireless communication by a base station is provided. The method may include generating a DL signal including system information for transmitting to a UE during an RACH procedure. The method may also include transmitting, to the UE in the system information, an indication of a waveform configuration of the DL signal for a subsequently transmitted DL signal.

In another aspect, a UE having a memory storing instructions and one or more processors coupled with the memory, is provided. The UE may be configured to identify a waveform configuration of a DL signal including system information to be received from a base station during an RACH procedure in response to an indication of the waveform configuration of the DL signal. The UE may be configured to receive, from the base station, the system information in response to the waveform configuration of the DL signal being identified.

In another aspect, a base station having a memory storing instructions and one or more processors coupled with the memory, is provided. The base station may be configured to generate a DL signal including system information for transmitting to a UE during an RACH procedure. The base station may be configured to transmit, to the UE in the system information, an indication of a waveform configuration of the DL signal for a subsequently transmitted DL signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 is flowchart of an example method performed by the UE of FIG. 1, according to aspects of the present disclosure.

DETAILED DESCRIPTION

Figure 1:
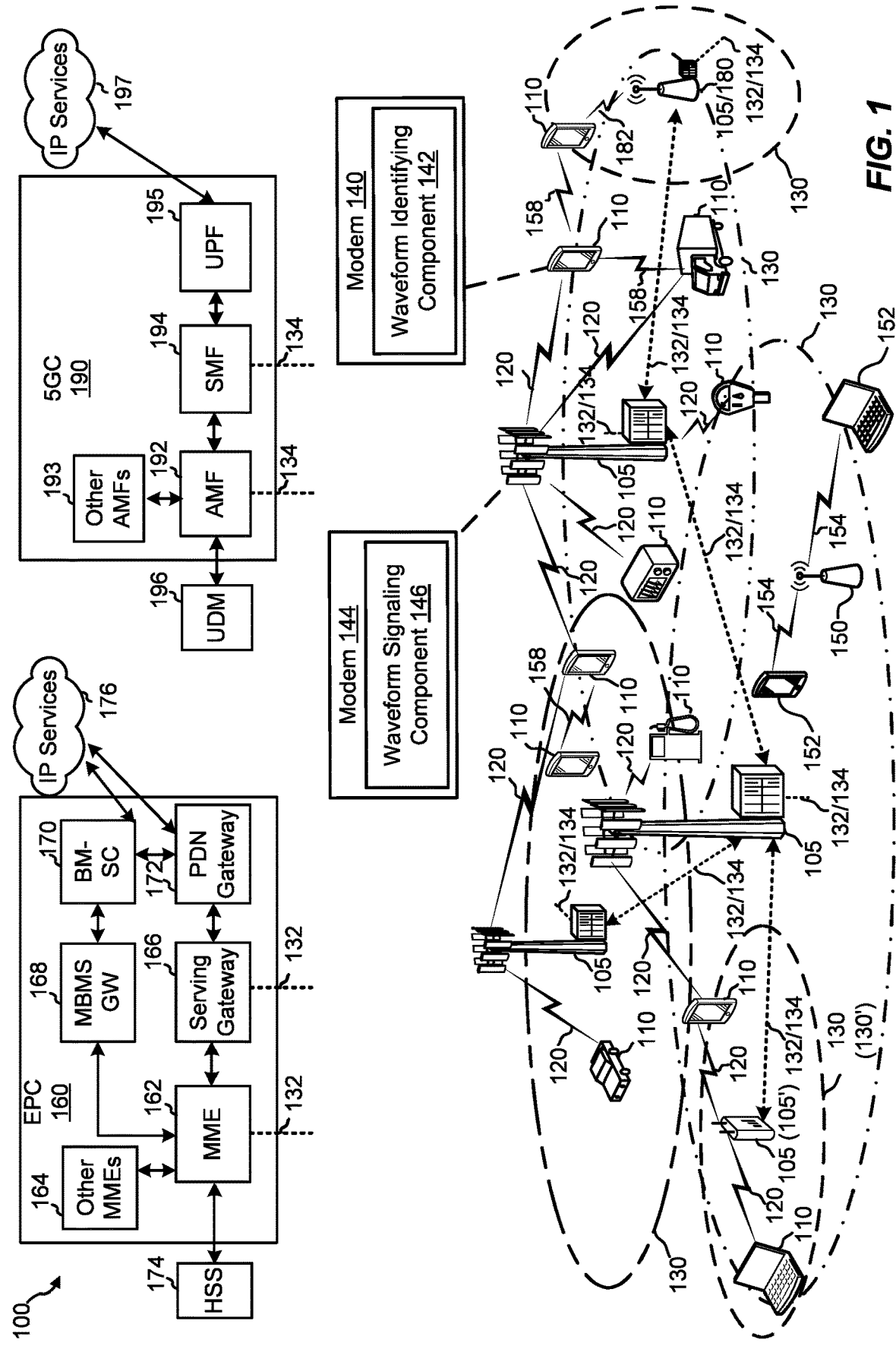
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventionally, random access channel (RACH) procedures include cyclic prefix-orthogonal frequency division multiplexing (CP-OFDM) waveforms for both downlink (DL) and uplink (UL) communications. With the advent of fifth generation (5G) new radio (NR) technologies, single-carrier waveforms may also be used for RACH procedures during UL communications. However, in some situations, such as when receiving a system information block type 1 (SIB1) or paging information or other system information from a base station during a RACH procedure, a user equipment (UE) may not know what waveform configuration (e.g., CP-OFDM or single-carrier) is being received.

Aspects of the present disclosure provide techniques to overcome one or more of the above-disclosed discrepancies. In an example, a UE may be pre-configured to or dynamically determine a waveform configuration for a future communication such as an SIB1 signal or a paging information signal or another system information signal based on one or more indications. For example, the UE may determine the waveform configuration based on a frequency band level of a waveform or an indication in a previous signal such as a synchronization signal block (SSB) for an SIB1 signal, or an SIB1 signal for a paging information signal or another system information signal.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, methods and computer-readable mediums according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In an example, a UE 110 may include a modem 140 and/or a waveform identifying component 142 for managing waveforms in a RACH procedure through the use of one or more rules. In another example, a base station 105 may include a modem 144 and/or a waveform signaling component 146 for indicating waveforms to the UE 110 in a RACH procedure through the use of one or more rules.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or DL (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D), or sidelink, communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user and protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
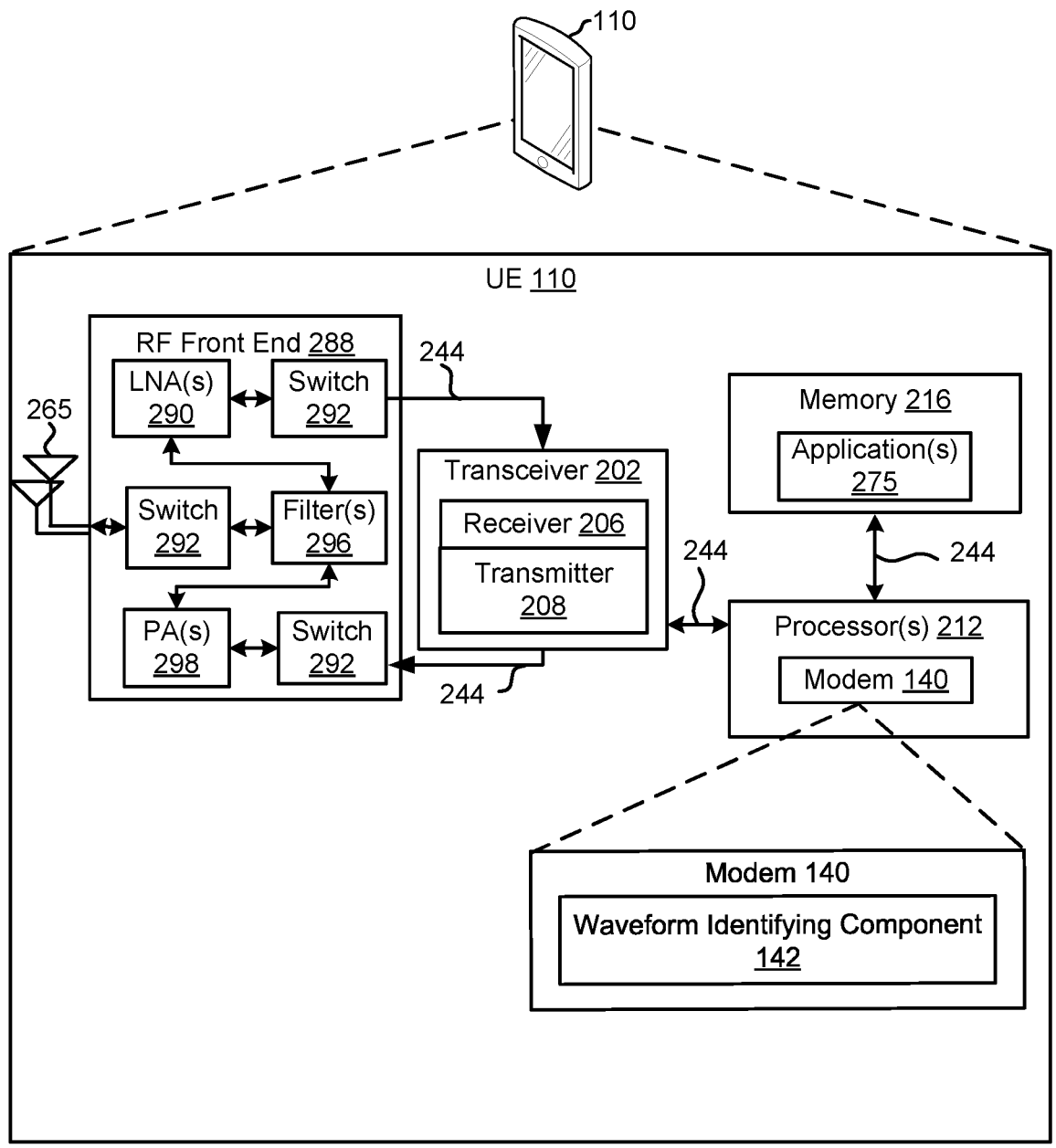
FIG. 2 is a schematic diagram of an example of a user equipment (UE) of FIG. 1, according to aspects of the present disclosure.

Referring to FIG. 2, an example implementation of a UE 110 may include the modem 140 having the waveform identifying component 142. The modem 140 and/or the waveform identifying component 142 of the UE 110 may be configured to identify a waveform configuration for a DL signal to be received by the UE 110 during a RACH procedure.

In some implementations, the UE 110 may include a variety of components, including components such as one or more processors 212 and memory 216 and transceiver 202 in communication via one or more buses 244, which may operate in conjunction with the modem 140 and/or the waveform identifying component 142 to enable one or more of the functions, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the waveform identifying component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the waveform identifying component 142 may be performed by the transceiver 202.

Also, the memory 216 may be configured to store data used herein and/or local versions of applications 275 or the waveform identifying component 142 and/or one or more subcomponents of the waveform identifying component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the waveform identifying component 142 and/or one or more of its subcomponents, and/or data associated therewith, when the UE 110 is operating at least one processor 212 to execute the waveform identifying component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use.

Figure 3:
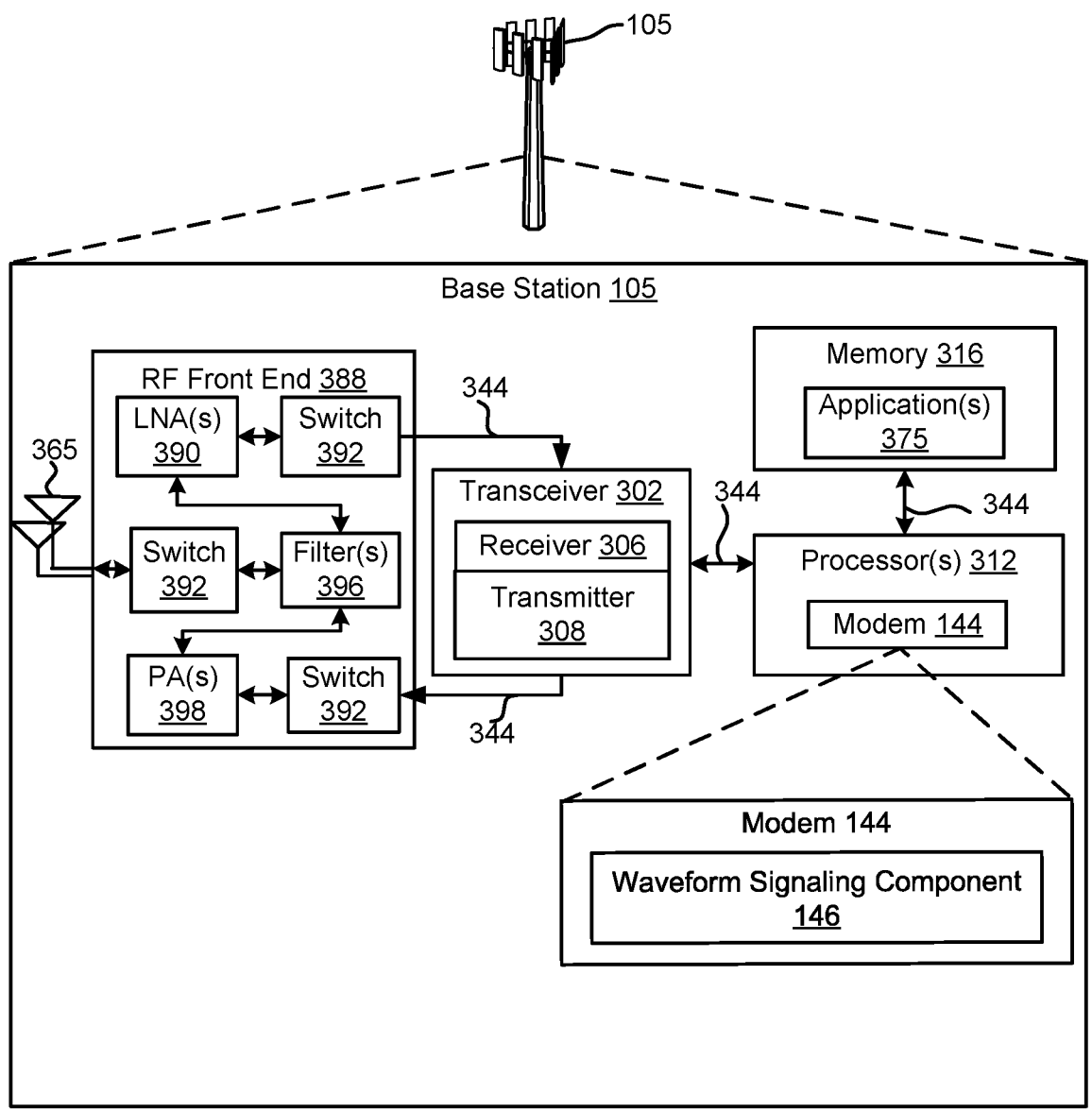
FIG. 3 is a schematic diagram of an example of a base station of FIG. 1, according to aspects of the present disclosure.

Referring to FIG. 3, an example implementation of a base station 105 may include the modem 144 having the waveform signaling component 146. The modem 144 and/or the waveform signaling component 146 of the base station 105 may be configured to signal a waveform configuration for a DL signal to be received by the UE 110 during a RACH procedure.

In some implementations, the base station 105 may include a variety of components, including components such as one or more processors 312 and memory 316 and transceiver 302 in communication via one or more buses 344, which may operate in conjunction with the modem 144 and/or the waveform signaling component 146 to enable one or more of the functions, described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions related to the waveform signaling component 146 may be included in the modem 144 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 144 may configure the base station 105 and the processors 312. In other aspects, some of the features of the one or more processors 312 and/or the modem 144 associated with the waveform signaling component 146 may be performed by the transceiver 302.

Also, the memory 316 may be configured to store data used herein and/or local versions of applications 375, or the waveform signaling component 146 and/or one or more subcomponents of the waveform signaling component 146 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the waveform signaling component 146 and/or one or more of the subcomponents, and/or data associated therewith, when the base station 105 is operating at least one processor 312 to execute the waveform signaling component 146 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by the base stations 105 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the base station 105 may communicate with, for example, the UEs 110, the base station 105, or one or more cells associated with one or more of the base station 105. In an aspect, for example, the modem 144 may configure the transceiver 302 to operate at a specified frequency and power level based on the repeater configuration of the base station 105 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the base station 105 (e.g., RF front end 388, transceiver 302) to enable transmission and/or reception of signals from the network based on a specified modem configuration. In an aspect, the modem configuration may be based on the mode of the modem 144 and the frequency band in use.

5G NR waveforms may include CP-OFDM waveforms for DL and UL communications and may include single-carrier waveforms for UL communications. Some benefits of the CP-OFDM waveforms may include high signal-to-noise ratio, high spectral efficiency, high order multiple-input and multiple-output (MIMO), and/or high data rate, in comparison with single-carrier waveforms. Some benefits of single-carrier waveforms may include low peak-to-average power ratio (PAPR), single layer (in NR), and/or power-efficient transmission (e.g., coverage/transmission power limited scenarios), in comparison with CP-OFDM waveforms.

In an aspect, CP-OFDM waveforms may continue to be supported for higher bands (e.g., frequency range 4 (FR4) and beyond), may be backward compatible with FR1/FR2/FR2x waveforms, and in scenarios where energy efficiency requirement is more relaxed, may offer high spectral efficiency.

In another aspect, single carrier waveforms may be supported for other scenarios requiring high energy efficiency, such as, lower PAPR that may translate to higher power amplifier (PA) efficiency, high data rate may be achieved due to massive spectrum availability. To facilitate frequency domain equalization, CP may be introduced to create OFDM-like blocks or symbols. Further, a guard interval (GI), which is a known sequence, may be considered as a special case of CP in this context.

Figure 4:
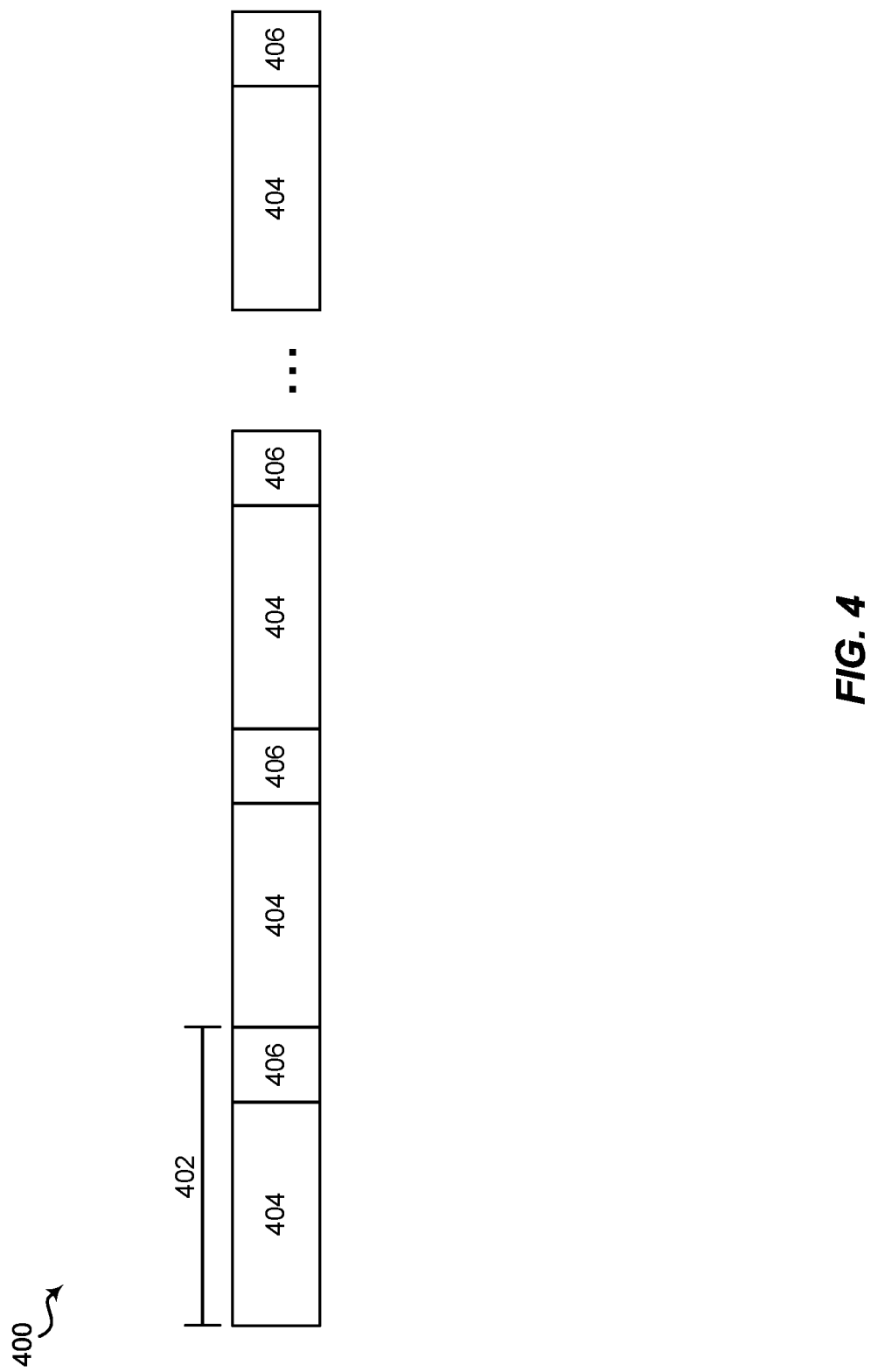
FIG. 4 is a block diagram of an example single-carrier waveform scheme, according to aspects of the present disclosure.

Examples of single-carrier waveforms may include, but are not limited to, a direct fourier transform spread OFDM (DFT-s-OFDM) waveforms or a single-carrier-quadrature amplitude modulation (SC-QAM) waveforms. The DFT-s-OFDM waveforms may provide a single-carrier transmission scheme for frequency domain implementations. In an example, the DFT-s-OFDM waveforms may be based on frequency-domain transform precoding at transmission and frequency-domain equalization at reception, which may result in a relatively high complexity to use this type of single-carrier scheme. However, the DFT-s-OFDM waveforms may provide more efficient bandwidth (BW) utilization than the SC-QAM waveforms. In an example, the DFT-s-OFDM waveforms may also provide flexible bandwidth allocation, which may allow support for large BWs. The SC-QAM waveforms may provide a single-carrier transmission scheme for time-domain implementations. Referring to FIG. 4, an example frame 400 (or subframe) for a SC-QAM waveform may include a symbol 402 that includes resources for data 404 and a guard interval 406. In an example, SC-QAM waveforms may be based on time-domain filtering (e.g., pulse shaping filters at transmission, and matched filtering/time-domain equalization at reception, which may result in lower complexity to use this type of single-carrier scheme. For SC-QAM, BW growth by time-domain filtering may be implemented with the use of guard bands. Further, SC-QAM may require restricted bandwidth allocation, resulting in the complexity growing to support diverse BW allocation.

Figure 5:
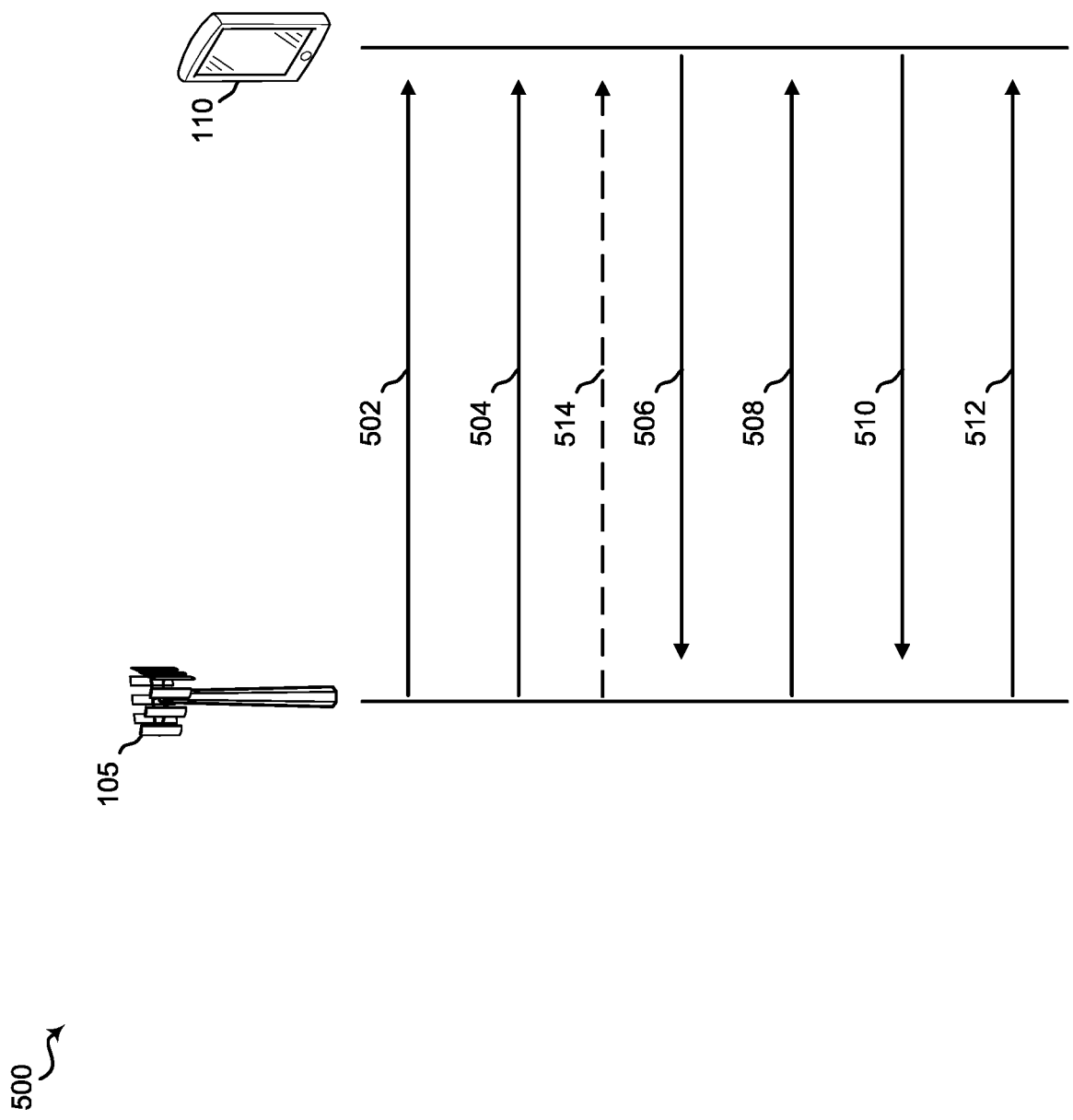
FIG. 5 is a ladder diagrams of a 4-step random access channel (RACH) procedure, according to aspects of the present disclosure.

Referring to FIG. 5, an example RACH procedure 500 may include communications between the base station 105 and the UE 110. Initially, the base station 105 may transmit, and the UE 110 may receive, a synchronization signal block (SSB) signal 502 including, for example, a primary synchronization signal (PSS), a secondary synchronization signal (SSS), and/or a physical broadcast channel (PBCH), which may provide timing and frequency information to the UE 110 to access the base station 105.

Next, the base station 105 may transmit, and the UE 110 may receive, an SIB1 signal 504 on a physical DL control channel (PDCCH) or a physical data shared channel (PDSCH). The SIB1 signal 504 may provide information for the UE 110 to access the base station 105 and/or for scheduling additional communications.

In response, the UE 110 may transmit, and the base station 105 may receive, a message type 1 (MSG1) signal 506 including a PRACH preamble on a physical RACH (PRACH). The PRACH preamble may include a random preamble selected by the UE 110, and may allow the base station 105 to estimate transmission timing and synchronize with the UE 110.

Next, the base station 105 may transmit, and the UE 110 may receive, a message type 2 (MSG2) signal 508 including a random access response (RAR) on a PDCCH or a PDSCH. The MSG2 signal 508 may include, for example, information including timing advance (TA) commands to adjust the transmit timing of the UE 110, a UL grant (e.g., assigned resources) for scheduling a message type 3 (MSG3) signal 510, and/or a temporary cell-radio network temporary identifier (TC-RNTI) for identifying the link between the base station 105 and the UE 110.

Further, the UE 110 may transmit, and the base station 105 may receive, the MSG3 signal 510 on a physical UL shared channel (PUSCH), in response to the MSG2 signal 508. The MSG3 signal 510 may include, for example, a radio resource control (RRC) connection request, a scheduling request, or a buffer status, to request connection with the base station 105.

Next, the base station 105 may transmit, and the UE 110 may receive, a message type 4 (MSG4) signal 512 on a PDCCH or a PDSCH, which may include a contention resolution message and/or a contention resolution identifier to indicate to the UE 110 that the contention resolution is successful.

Optionally, the base station 105 may transmit, and the UE 110 may receive, one or more paging signals 514 (or an additional system information signals) to provide additional information for the UE 110 to access the base station 105 and/or for scheduling additional communications. While FIG. 5 illustrates a paging signal 514 being transmitted between the SIB1 signal 504 and MSG1 signal 506, in other examples, a paging signal 514 may also be transmitted or alternatively be transmitted between different signals (e.g., in response to UE 110 requesting additional system information).

Using the 4-step RACH procedure 500, the UE 110 may need to know a waveform configuration (e.g., CP-OFDM or single-carrier) for the SIB1 signal 504 and/or the paging signal 514. Accordingly, aspects of the present disclosure provide techniques for identifying the configuration of the DL waveforms (e.g., CP-OFDM waveform vs single-carrier waveform) during the RACH procedure 500.

In an aspect, the UE 110 may identify a waveform configuration (e.g., CP-OFDM or single-carrier) of the SIB1 signal 504 through one or more of the following examples. In a first SIB1 example, the UE 110 may be pre-configured (e.g. preprogrammed or programmed via base station 105) to identify a waveform configuration of the SIB1 signal 504 (e.g., on PDCCH or PDSCH) based on, for example, a frequency band level of DL signal. For example, a different band of the PDCCH or PDSCH may correspond to a different fixed waveform configuration, such as a CP-OFDM waveform may correspond to a lower frequency band level (e.g., less than 60 GHz), and a single-carrier waveform may correspond to a higher frequency band level (e.g., greater than or equal to 60 GHz).

In a second SIB1 example, the UE 110 may identify the waveform configuration (e.g., CP-OFDM or single-carrier) of the SIB1 signal 504 (on PDSCH or PDCCH) based on, for example, an indication in the SSB signal 502 from the base station 105. The indication may include, for example, one or more bits in the PBCH (MIB) of the SSB signal 502 that may indicate to the UE 110 the waveform configuration (e.g., CP-OFDM or a type of single-carrier, such as SC QAM, DFT-s-OFDM, or any other type of single carrier waveform) for the SIB1 signal 504. In this example, a single bit may be used to indicate either a CP-OFDM waveform or a single-carrier waveform, or multiple bits may be used to indicate a CP-OFDM waveform and different single-carrier waveforms. Alternatively, the indication may be based on a configuration type of the PBCH demodulation reference signal (DMRS) of the SSB signal 502. In this example, a first configuration type of the PBCH DMRS may indicate a first waveform configuration of the SIB1 signal 504, a second configuration type of the PBCH DMRS may indicate a second waveform configuration of the SIB1 signal 504, etc. In another alternative example, the indication may be based on one or more set of sequences for the PSS signal or the SSS signal of the SSB signal 502. In this example, a set of sequences of the PSS signal or the SSS signal of the SSB signal 502 may indicate a waveform configuration of the SIB1 signal 504, or a subset of sequences in the PSS signal and the SSS signal of the SSB signal 502 may indicate a waveform configuration of the SIB1 signal 504.

In a third SIB1 example, the UE 110 may be pre-configured (e.g. preprogrammed or programmed via base station 105) to identify a waveform configuration of the SIB1 signal 504 (e.g., on PDCCH or PDSCH) based on, for example, one or more fixed frequency band levels and one or more configurable frequency band levels. For example, a first frequency band level (e.g., less than 60 GHz) of the PDCCH or PDSCH may correspond to a specific waveform configuration (e.g., CP-OFDM or single carrier) and a second frequency band level (e.g., greater than or equal to 60 GHz) may be configurable according to the second SIB1 example described herein.

In an aspect, the UE 110 may identify a waveform configuration of the paging signal 514 through one or more of the following examples. In a first paging example, the UE 110 may be pre-configured (e.g. preprogrammed or programmed via base station 105) to identify a waveform configuration of the paging signal 514 (e.g., on PDCCH or PDSCH) based on, for example, a band of the DL signal. For example, a different band of the PDCCH or PDSCH may correspond to a different fixed waveform configuration, such as a CP-OFDM waveform may correspond to a lower frequency band level (e.g., less than 60 GHz), and a single-carrier waveform may correspond to a higher frequency band level (e.g., greater than or equal to 60 GHz).

In a second paging example, the UE 110 may identify the waveform configuration the paging signal 514 (e.g., on PDCCH or PDSCH) based on, for example, the waveform configuration of the SIB1 signal 504. For example, the UE 110 may determine the waveform configuration of the paging signal 514 on the PDCCH is one of a CP-OFDM waveform or a single-carrier waveform because a same waveform configuration of the SIB1 signal 504 on the PDCCH is used. In another example, the UE 110 may determine the waveform configuration of the paging signal 514 on the PDCSH is one of a CP-OFDM waveform or a single-carrier waveform because a same waveform configuration of the SIB1 signal 504 on the PDCSH is used.

In a third paging example, the UE 110 may identify the waveform configuration (e.g., CP-OFDM or single-carrier) of the paging signal 514 (on PDSCH or PDCCH) based on, for example, an indication in the SIB1 signal 504 from the based station 105. For example, the SIB1 signal 504 may indicate to the UE 110 the waveform configuration (e.g., CP-OFDM or single-carrier) of the paging signal 514. In this example, the waveform configuration for the paging signal 514 (on PDSCH or PDDCH) may be different from a waveform configuration of the SIB1 signal 504.

In a fourth example, the UE 110 may identify the waveform configuration (e.g., CP-OFDM or single-carrier) of the paging signal 514 on a PDSCH based on the paging signal 514 on the PDCCH. For example, the paging signal 514 on the PDSCH may be indicated in the paging signal 514 on the PDCCH (e.g., DCI), or a waveform configuration the paging signal 514 on the PDSCH may be the same waveform configuration as the waveform configuration of the paging signal 514 on the PDCCH.

Referring to FIG. 6, an example of a method 600 for wireless communications may be performed by a UE 110 of the wireless communication network 100. For example, operations of the method 600 may be performed by the waveform identifying component 142, the modem 140, the transceiver 202, the processor 212, the memory 216, and or any other component/subcomponent of the UE 110.

At block 602, the method 600 may include identifying a waveform configuration of a DL signal including system information to be received from a base station during an RACH procedure in response to an indication of the waveform configuration of the DL signal. For example, the waveform identifying component 142, the modem 140, the transceiver 202, the processor 212, and/or the memory 216 of the UE 110, and/or one or more additional components/subcomponents of the UE 110 may be configured to or may comprise means for identifying a waveform configuration of a DL signal including system information to be received from a base station during an RACH procedure in response to an indication of the waveform configuration of the DL signal.

For example, the identifying of the waveform configuration of the DL waveform at block 602 may include identifying by the waveform identifying component 142, the modem 140, the transceiver 202, the processor 212, and/or the memory 216 of the UE 110, the waveform configuration (e.g., CP-OFDM or single-carrier) of a DL signal (e.g., SIB1 signal 504 or paging signal 514 on PDDCH or PDSCH)

including system information to be received from the base station 105 during the RACH procedure 500 in response to an indication (e.g., preconfigured or received from base station 105) of the waveform configuration of the DL signal.

In an aspect, the indication of the waveform configuration of the DL signal may be based on a frequency band level of the DL signal. For example, the waveform configuration of the DL signal may be a first configuration (e.g., CP-OFDM) in response to the frequency band level being less than a threshold (e.g., less than 60 GHz), and may be a second configuration (e.g., single carrier) in response to the frequency band level being equal to or greater than the threshold (e.g., equal to or greater than 60 GHz).

In another aspect, the indication of the waveform configuration of the DL signal (e.g., SIB1 signal 504 or paging signal 514) may be based on a linked relation of the waveform configuration of the DL signal to a waveform configuration of a previously received signal (e.g., SSB signal 502 or SIB1 signal 504). For example, the waveform configuration of the DL signal may be a first configuration (e.g., single carrier) in response to the waveform configuration for the previously received signal being the first configuration. In another example, the waveform configuration of the DL signal may be a first configuration (e.g., single carrier) in response to the waveform configuration for the previously received signal being a second configuration (e.g., CP-OFDM). In another example, if the DL signal correspond to the SIB1 signal 504 and the previously received signal corresponds to the SSB signal 502, the indication of the waveform configuration of the DL signal may be based on one or more bits of an MIB of a PBCH of the SSB signal 502, the indication of the waveform configuration of the DL signal may be based on a configuration type of a DMRS of a PBCH of the SSB signal 502, or the indication of the waveform configuration of the DL signal may be based on a set of sequences corresponding to one or more of a PSS of the SSB signal 502 or an SSS of the SSB signal 502.

At block 604, the method 600 may include receiving, from the base station, the system information in response to the waveform configuration of the DL signal being identified. For example, the waveform identifying component 142, the modem 140, the transceiver 202, the processor 212, and/or the memory 216 of the UE 110, and/or one or more additional components/subcomponents of the UE 110 may be configured to or may comprise means for receiving, from the base station, the system information in response to the waveform configuration of the DL signal being identified.

For example, the receiving of the system information at block 604 may include receiving by the waveform identifying component 142, the modem 140, the transceiver 202, the processor 212, and/or the memory 216 of the UE 110, from the base station 105, the system information (e.g., SIB1 signal 504 or paging signal 514) in response to the waveform configuration of the DL signal being identified.

Figure 7:
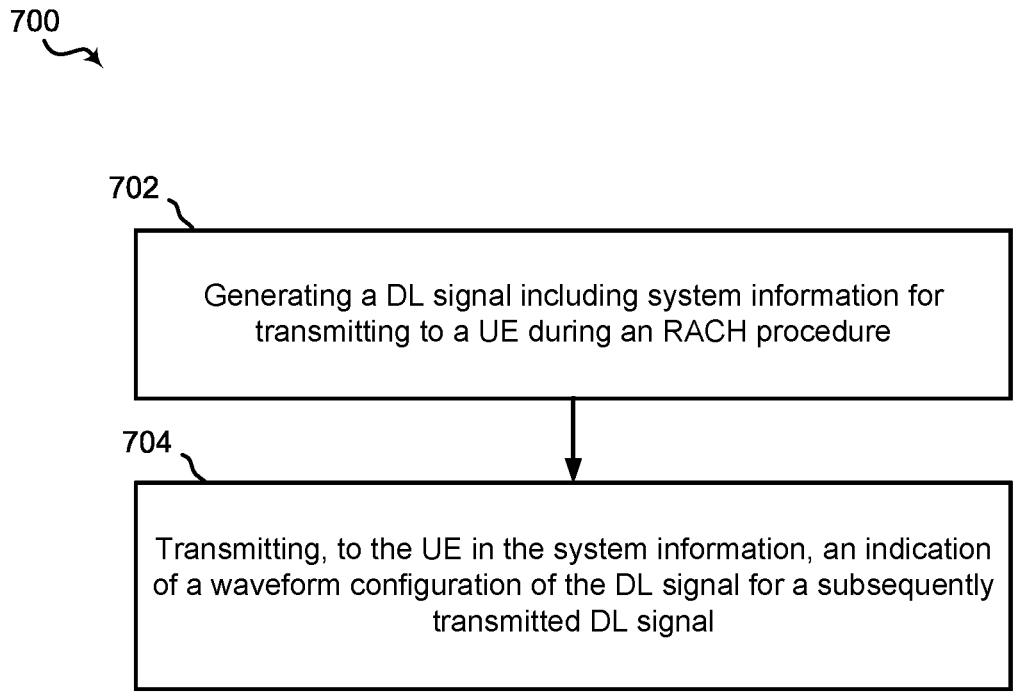
FIG. 7 is flowchart of an example method performed by the base station of FIG. 1, according to aspects of the present disclosure.

Referring to FIG. 7, an example of a method 700 for wireless communications may be performed by the base station 105 of the wireless communication network 100. For example, operations of the method 700 may be performed by the waveform signaling component 146, the modem 144, the transceiver 302, the processor 312, the memory 316, and or any other component/subcomponent of the base station 105.

At block 702, the method 700 may include generating a DL signal including system information for transmitting to a UE during an RACH procedure. For example, the waveform signaling component 146, the modem 144, the transceiver 302, the processor 312, and/or the memory 316 of the base station 105, and/or one or more additional components/subcomponents of the base station 105 may be configured to or may comprise means for generating a DL signal including system information for transmitting to a UE during an RACH procedure.

For example, the generating of the DL signal at block 702 may include generating by the waveform signaling component 146, the modem 144, the transceiver 302, the processor 312, and/or the memory 316 of the base station 105, the DL signal (e.g., SIB1 signal 504 or paging signal 514 on PDDCH or PDSCH) including system information for transmitting to the UE 110 during the RACH procedure 500.

At block 704, the method 700 may include transmitting, to the UE in the system information, an indication of a waveform configuration of the DL signal for a subsequently transmitted DL signal. For example, the waveform signaling component 146, the modem 144, the transceiver 302, the processor 312, and/or the memory 316 of the base station 105, and/or one or more additional components/subcomponents of the base station 105 may be configured to or may comprise means for transmitting, to the UE in the system information, an indication of a waveform configuration of the DL signal for a subsequently transmitted DL signal.

For example, the transmitting of the indication of the waveform configuration of the DL waveform at block 704 may include transmitting by the waveform signaling component 146, the modem 144, the transceiver 302, the processor 312, and/or the memory 316 of the base station 105, to the UE 110 in the system information, an indication of a waveform configuration (e.g., CP-OFDM or single carrier) of the DL signal (e.g., SSB signal 502 or SIB1 signal 504) for a subsequently transmitted DL signal (e.g., SIB1 signal 504 or paging signal 514).

In an aspect, the indication of the waveform configuration of the DL signal may be based on a linked relation of the waveform configuration of the DL signal to a waveform configuration of the subsequently transmitted DL signal.

In another aspect, the waveform configuration of the subsequently transmitted DL signal may be a first configuration (e.g., single carrier) in response to the waveform configuration for the DL signal being the first configuration.

In another aspect, the waveform configuration of the subsequently transmitted DL signal is a first configuration (e.g., single carrier) in response to the waveform configuration for the DL signal being a second configuration (e.g., CP-OFDM).

In another aspect, if the DL signal corresponds to the SSB signal 502 and the subsequently transmitted DL signal corresponds to SIB1 signal 504, the indication of the waveform configuration of the DL signal may be based on one or more bits of the MIB of the PBCH of the SSB signal 502, the indication of the waveform configuration of the DL signal may be based on a configuration type of the DMRS of the PBCH of the SSB signal 502, or the indication of the waveform configuration of the DL signal may be based on a set of sequences corresponding to one or both of the PSS or the SSS of the SSB signal 502.

ADDITIONAL IMPLEMENTATIONS

An example first method of wireless communication by a UE, comprising: identifying a waveform configuration of a DL signal including system information to be received from a base station during an RACH procedure in response to an indication of the waveform configuration of the DL signal;

and receiving, from the base station, the system information in response to the waveform configuration of the DL signal being identified.

The above-example first method, wherein the waveform configuration of the DL signal is one of a CP-OFDM configuration or a single-carrier configuration.

One or more of the above-example first methods, wherein the indication of the waveform configuration of the DL signal is based on a frequency band level of the DL signal.

One or more of the above-example first methods, wherein the waveform configuration of the DL signal is a first configuration in response to the frequency band level being less than a threshold, and is a second configuration in response to the frequency band level being equal to or greater than the threshold.

One or more of the above-example first methods, wherein the indication of the waveform configuration of the DL signal is based on a linked relation of the waveform configuration of the DL signal to a waveform configuration of a previously received signal.

One or more of the above-example first methods, wherein the waveform configuration of the DL signal is a first configuration in response to the waveform configuration for the previously received signal being the first configuration.

One or more of the above-example first methods, wherein the waveform configuration of the DL signal is a first configuration in response to the waveform configuration for the previously received signal being a second configuration.

One or more of the above-example first methods, wherein the DL signal corresponds to an SIB1 signal and the previously received signal corresponds to an SSB signal.

One or more of the above-example first methods, wherein the indication of the waveform configuration of the DL signal is based on one or more bits of an MIB of a PBCH of the SSB signal.

One or more of the above-example first methods, wherein the indication of the waveform configuration of the DL signal is based on a configuration type of a DMRS of a PBCH of the SSB signal.

One or more of the above-example first methods, wherein the indication of the waveform configuration of the DL signal is based on a set of sequences corresponding to one or both of a PSS of the SSB signal or a SSS of the SSB signal.

An example second method of wireless communication by a base station, comprising: generating a DL signal including system information for transmitting to a UE during an RACH procedure; and transmitting, to the UE in the system information, an indication of a waveform configuration of the DL signal for a subsequently transmitted DL signal.

The above-example second method, wherein the waveform configuration of the DL signal is one of a CP-OFDM configuration or a single-carrier configuration.

One or more of the above-example second methods, wherein the indication of the waveform configuration of the DL signal is based on a linked relation of the waveform configuration of the DL signal to a waveform configuration of the subsequently transmitted DL signal.

One or more of the above-example second methods, wherein the waveform configuration of the subsequently transmitted DL signal is a first configuration in response to the waveform configuration for the DL signal being the first configuration.

One or more of the above-example second methods, wherein the waveform configuration of the subsequently transmitted DL signal is a first configuration in response to the waveform configuration for the DL signal being a second configuration.

One or more of the above-example second methods, wherein the DL signal corresponds to an SSB signal and the subsequently transmitted DL signal corresponds to an SIB1 signal.

One or more of the above-example second methods, wherein the indication of the waveform configuration of the DL signal is based on one or more bits of an MIB of a PBCH of the SSB signal.

One or more of the above-example second methods, wherein the indication of the waveform configuration of the DL signal is based on a configuration type of a DMRS of a PBCH of the SSB signal.

One or more of the above-example second methods, wherein the indication of the waveform configuration of the DL signal is based on a set of sequences corresponding to one or both of a PSS of the SSB signal or an SSS of the SSB signal.

An example UE, comprising: a memory storing instructions; and one or more processors coupled with the memory and configured to: identify a waveform configuration of a downlink (DL) signal including system information to be received from a base station during a random access channel (RACH) procedure in response to an indication of the waveform configuration of the DL signal; and receive, from the base station, the system information in response to the waveform configuration of the DL signal being identified.

The above-example UE, wherein the waveform configuration of the DL signal is one of a cyclic prefix-orthogonal frequency division multiplexing (CP-OFDM) configuration or a single-carrier configuration.

One or more of the above-example UEs, wherein the indication of the waveform configuration of the DL signal is based on a frequency band level of the DL signal.

One or more of the above-example UEs, wherein the waveform configuration of the DL signal is a first configuration in response to the frequency band level being less than a threshold, and is a second configuration in response to the frequency band level being equal to or greater than the threshold.

One or more of the above-example UEs, wherein the indication of the waveform configuration of the DL signal is based on a linked relation of the waveform configuration of the DL signal to a waveform configuration of a previously received signal.

One or more of the above-example UEs, wherein the waveform configuration of the DL signal is a first configuration in response to the waveform configuration for the previously received signal being the first configuration.

One or more of the above-example UEs, wherein the waveform configuration of the DL signal is a first configuration in response to the waveform configuration for the previously received signal being a second configuration.

One or more of the above-example UEs, wherein the DL signal corresponds to a system information block type 1 (SIB1) signal and the previously received signal corresponds to a synchronization signal block (SSB) signal.

One or more of the above-example UEs, wherein the indication of the waveform configuration of the DL signal is based on one or more bits of a master information block (MIB) of a physical broadcast channel (PBCH) of the SSB signal.

One or more of the above-example UEs, wherein the indication of the waveform configuration of the DL signal is based on a configuration type of a demodulation reference signal (DMRS) of a physical broadcast channel (PBCH) of the SSB signal.

One or more of the above-example UEs, wherein the indication of the waveform configuration of the DL signal is based on a set of sequences corresponding to one or both of a primary synchronization signal (PSS) of the SSB signal or a secondary synchronization signal (SSS) of the SSB signal.

An example base station, comprising: a memory storing instructions; and one or more processors coupled with the memory and configured to: generate a downlink (DL) signal including system information for transmitting to a user equipment (UE) during a random access channel (RACH) procedure; and transmit, to the UE in the system information, an indication of a waveform configuration of the DL signal for a subsequently transmitted DL signal.

The above-example base station, wherein the waveform configuration of the DL signal is one of a cyclic prefix-orthogonal frequency division multiplexing (CP-OFDM) configuration or a single-carrier configuration.

One or more of the above-example base stations, wherein the indication of the waveform configuration of the DL signal is based on a linked relation of the waveform configuration of the DL signal to a waveform configuration of the subsequently transmitted DL signal.

One or more of the above-example base stations, wherein the waveform configuration of the subsequently transmitted DL signal is a first configuration in response to the waveform configuration for the DL signal being the first configuration.

One or more of the above-example base stations, wherein the waveform configuration of the subsequently transmitted DL signal is a first configuration in response to the waveform configuration for the DL signal being a second configuration.

One or more of the above-example base stations, wherein the DL signal corresponds to a synchronization signal block (SSB) signal and the subsequently transmitted DL signal corresponds to a system information block type 1 (SIB1) signal.

One or more of the above-example base stations, wherein the indication of the waveform configuration of the DL signal is based on one or more bits of a master information block (MIB) of a physical broadcast channel (PBCH) of the SSB signal.

One or more of the above-example base stations, wherein the indication of the waveform configuration of the DL signal is based on a configuration type of a demodulation reference signal (DMRS) of a physical broadcast channel (PBCH) of the SSB signal.

One or more of the above-example base stations, wherein the indication of the waveform configuration of the DL signal is based on a set of sequences corresponding to one or both of a primary synchronization signal (PSS) of the SSB signal or a secondary synchronization signal (SSS) of the SSB signal.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   identifying a waveform configuration of a downlink (DL) signal including system information to be received from a base station during a random access channel (RACH) procedure in response to an indication of the waveform configuration of the DL signal;
   receiving, from the base station, the system information in response to the waveform configuration of the DL signal being identified;
   wherein the indication of the waveform configuration of the DL signal is based on a linked relation of the waveform configuration of the DL signal to a waveform configuration of a previously received signal; and
   wherein the DL signal corresponds to a system information block type 1 (SIB1) signal and the previously received signal corresponds to a synchronization signal block (SSB) signal.

2. The method of claim 1, wherein the waveform configuration of the DL signal is one of a cyclic prefix-orthogonal frequency division multiplexing (CP-OFDM) configuration or a single-carrier configuration.

3. The method of claim 1, wherein the indication of the waveform configuration of the DL signal is based on a frequency band level of the DL signal.

4. The method of claim 3, wherein the waveform configuration of the DL signal is a first configuration in response to the frequency band level being less than a threshold, and is a second configuration in response to the frequency band level being equal to or greater than the threshold.

5. The method of claim 1, wherein the waveform configuration of the DL signal is a first configuration in response to the waveform configuration for the previously received signal being the first configuration.

6. The method of claim 1, wherein the waveform configuration of the DL signal is a first configuration in response to the waveform configuration for the previously received signal being a second configuration.

7. The method of claim 1, wherein the indication of the waveform configuration of the DL signal is based on one or more bits of a master information block (MIB) of a physical broadcast channel (PBCH) of the SSB signal.

8. The method of claim 1, wherein the indication of the waveform configuration of the DL signal is based on a configuration type of a demodulation reference signal (DMRS) of a physical broadcast channel (PBCH) of the SSB signal.

9. The method of claim 1, wherein the indication of the waveform configuration of the DL signal is based on a set of sequences corresponding to one or both of a primary synchronization signal (PSS) of the SSB signal or a secondary synchronization signal (SSS) of the SSB signal.

10. A method of wireless communication by a base station, comprising:
    generating a downlink (DL) signal including system information for transmitting to a user equipment (UE) during a random access channel (RACH) procedure;
    transmitting, to the UE in the system information, an indication of a waveform configuration of the DL signal for a subsequently transmitted DL signal;
    wherein the indication of the waveform configuration of the DL signal is based on a linked relation of the waveform configuration of the DL signal to a waveform configuration of the subsequently transmitted DL signal; and
    wherein the DL signal corresponds to a synchronization signal block (SSB) signal and the subsequently transmitted DL signal corresponds to a system information block type 1 (SIB1) signal.

11. The method of claim 10, wherein the waveform configuration of the DL signal is one of a cyclic prefix-orthogonal frequency division multiplexing (CP-OFDM) configuration or a single-carrier configuration.

12. The method of claim 10, wherein the waveform configuration of the subsequently transmitted DL signal is a first configuration in response to the waveform configuration for the DL signal being the first configuration.

13. The method of claim 10, wherein the waveform configuration of the subsequently transmitted DL signal is a first configuration in response to the waveform configuration for the DL signal being a second configuration.

14. The method of claim 10, wherein the indication of the waveform configuration of the DL signal is based on one or more bits of a master information block (MIB) of a physical broadcast channel (PBCH) of the SSB signal.

15. The method of claim 10, wherein the indication of the waveform configuration of the DL signal is based on a configuration type of a demodulation reference signal (DMRS) of a physical broadcast channel (PBCH) of the SSB signal.

16. The method of claim 10, wherein the indication of the waveform configuration of the DL signal is based on a set of sequences corresponding to one or both of a primary synchronization signal (PSS) of the SSB signal or a secondary synchronization signal (SSS) of the SSB signal.

17. A user equipment (UE), comprising:
a memory storing instructions; and
one or more processors coupled with the memory and configured to:
identify a waveform configuration of a downlink (DL) signal including system information to be received from a base station during a random access channel (RACH) procedure in response to an indication of the waveform configuration of the DL signal;
receive, from the base station, the system information in response to the waveform configuration of the DL signal being identified;
wherein the indication of the waveform configuration of the DL signal is based on a linked relation of the waveform configuration of the DL signal to a waveform configuration of a previously received signal; and
wherein the DL signal corresponds to a system information block type 1 (SIB1) signal and the previously received signal corresponds to a synchronization signal block (SSB) signal.

18. The UE of claim 17, wherein the waveform configuration of the DL signal is one of a cyclic prefix-orthogonal frequency division multiplexing (CP-OFDM) configuration or a single-carrier configuration.

19. The UE of claim 17, wherein the indication of the waveform configuration of the DL signal is based on a frequency band level of the DL signal.

20. The UE of claim 19, wherein the waveform configuration of the DL signal is a first configuration in response to the frequency band level being less than a threshold, and is a second configuration in response to the frequency band level being equal to or greater than the threshold.

21. A base station, comprising:
a memory storing instructions; and
one or more processors coupled with the memory and configured to:
generate a downlink (DL) signal including system information for transmitting to a user equipment (UE) during a random access channel (RACH) procedure;
transmit, to the UE in the system information, an indication of a waveform configuration of the DL signal for a subsequently transmitted DL signal;
wherein the indication of the waveform configuration of the DL signal is based on a linked relation of the waveform configuration of the DL signal to a waveform configuration of the subsequently transmitted DL signal; and
wherein the DL signal corresponds to a synchronization signal block (SSB) signal and the subsequently transmitted DL signal corresponds to a system information block type 1 (SIB1) signal.

22. The base station of claim 21, wherein the waveform configuration of the DL signal is one of a cyclic prefix-orthogonal frequency division multiplexing (CP-OFDM) configuration or a single-carrier configuration.

23. The base station of claim 21, wherein the waveform configuration of the subsequently transmitted DL signal is a first configuration in response to the waveform configuration for the DL signal being the first configuration.

24. The base station of claim 21, wherein the waveform configuration of the subsequently transmitted DL signal is a first configuration in response to the waveform configuration for the DL signal being a second configuration.

* * * * *